(12) United States Patent
Kim (10) Patent No.: US 12,455,169 B2
(45) Date of Patent: Oct. 28, 2025

(54) APPARATUS FOR GENERATING ROUTE AND METHOD THEREOF

(71) Applicants: Hyundai Motor Company, Seoul (KR); Kia Corporation, Seoul (KR)

(72) Inventor: Keun Jin Kim, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 254 days.

(21) Appl. No.: 17/895,943

(22) Filed: Aug. 25, 2022

(65) Prior Publication Data

US 2023/0266135 A1 Aug. 24, 2023

(30) Foreign Application Priority Data

Feb. 21, 2022 (KR) .................. 10-2022-0022513

(51) Int. Cl.
*G01C 21/34* (2006.01)
*B60L 58/12* (2019.01)
(Continued)

(52) U.S. Cl.
CPC .......... *G01C 21/3469* (2013.01); *B60L 58/12* (2019.02); *G01C 21/3407* (2013.01);
(Continued)

(58) Field of Classification Search
CPC ............ G01C 21/3469; G01C 21/3407; G01C 21/3476; G01C 21/3492; G01C 21/3453; G01C 21/3461; G01C 21/3697; G01C 21/3804; B60L 58/12; B60L 2240/622; B60L 2240/80; B60L 2250/16; B60L 2260/54; B60L 7/10; G06Q 50/06; G06Q 50/40; Y02T 10/70; Y02T 90/16; B60W 40/10; B60W 30/18; B60W 40/076; B60W 40/12; B60W 2540/00; B60W 2540/215; B60W 2552/00; B60W 2555/60; B60W 2556/40; B60W 2556/50; G06N 20/00
See application file for complete search history.

(56) References Cited

U.S. PATENT DOCUMENTS

8,972,161 B1 * 3/2015 Koebler .................. B60L 50/62
701/123
9,557,185 B2 * 1/2017 Kimes .................. G01C 21/343
(Continued)

*Primary Examiner* — Kenny Nguyen
(74) *Attorney, Agent, or Firm* — Morgan Lewis & Bockius LLP (57) ABSTRACT

An apparatus of generating a route includes a communication device receiving at least one of location information of a vehicle, map information, destination information, or a desired arrival time of a user, a route generator generating one or more candidate routes, based on at least one of the location information, the map information, or the destination information, a calculation device calculating at least one of an estimated arrival time for each route or an estimated SoC for each route with respect to respective candidate routes, based on at least one of the map information or the one or more candidate routes, a driving route determination device determining a driving route, based on at least one of the one or more candidate routes, the estimated arrival time for each route, the desired arrival time, or the estimated SoC for each route, and an interface guiding the user along the driving route.

16 Claims, 6 Drawing Sheets

(51) Int. Cl.
*G06Q 50/06* (2024.01)
*G06Q 50/40* (2024.01)

(52) U.S. Cl.
CPC ..... *G01C 21/3476* (2013.01); *G01C 21/3492* (2013.01); *G06Q 50/06* (2013.01); *G06Q 50/40* (2024.01)

(56) References Cited

U.S. PATENT DOCUMENTS

| | | | | |
|---|---|---|---|---|
| 9,792,736 | B1* | 10/2017 | Koebler | G07C 5/008 |
| 10,156,453 | B2* | 12/2018 | Park | G01C 21/20 |
| 2011/0191266 | A1* | 8/2011 | Matsuyama | G06Q 50/06 |
| | | | | 705/412 |
| 2015/0329102 | A1* | 11/2015 | Yoshikawa | B60W 10/06 |
| | | | | 701/1 |
| 2017/0262790 | A1* | 9/2017 | Khasis | G01C 21/3415 |
| 2017/0370738 | A1* | 12/2017 | Park | G01C 21/3667 |
| 2018/0082495 | A1* | 3/2018 | Koebler | B60W 10/10 |
| 2019/0322174 | A1* | 10/2019 | Koebler | B60T 13/586 |
| 2022/0012648 | A1* | 1/2022 | Uenoyama | B60L 53/665 |
| 2023/0143033 | A1* | 5/2023 | Shi | G06Q 50/40 |
| | | | | 705/307 |
| 2023/0230024 | A1* | 7/2023 | Tazume | G06Q 10/08355 |
| | | | | 705/338 |

* cited by examiner

APPARATUS FOR GENERATING ROUTE AND METHOD THEREOF

CROSS-REFERENCE TO RELATED APPLICATION

The present application claims priority to Korean Patent Application No. 10-2022-0022513, filed on Feb. 21, 2022, the entire contents of which is incorporated herein for all purposes by this reference.

BACKGROUND OF THE PRESENT DISCLOSURE

Field of the Present Disclosure

The present disclosure relates to an apparatus of generating a route to allow a vehicle to guide a user of the vehicle along a driving route and a method thereof.

Description of Related Art

The driver of the vehicle takes the passenger to the destination, and after a certain time elapses, he or she should return to the destination to pick up the passenger. Alternatively, the driver should return to the destination, which is the same place, due to the necessity of the driver's own business.

In the instant case, when the driver parks the vehicle at the destination and waits until a certain time elapses, he or she should pay a parking fee for using the parking lot or a fine for parking violation or may receive administrative penalties such as demerit points for a driver's license.

Alternatively, the driver may consider a method of driving in another area for a certain time and then returning to the destination.

In performing such a method, when the driver thinks and determines the route for returning to the destination after a certain time elapses by himself or herself, it is not only inaccurate to determine the time required, but also causes inconvenience to the driver.

In addition, when the driver sets the current location to the destination by a route guidance system such as existing navigation, route guidance is not provided because the vehicle is currently located near the destination.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of generating a route to generate a driving route where a user arrives at a destination to suit a desired arrival time and guide the user along the driving route to improve convenience of the user and a method thereof.

Another aspect of the present disclosure provides an apparatus configured to generate a route to generate one or more candidate routes, determine a driving route and calculate an estimated arrival time for each route, based on an estimated time for each link with respect to respective candidate routes, and guide the user along the determined driving route based on it to improve efficiency and predictability for time management of the user and a method thereof.

Another aspect of the present disclosure provides an apparatus of generating a route to calculate an estimated SoC for each route, based on one of the estimated amount of battery consumption for each link or the estimated amount of electrical energy recovery for each link and determine a candidate route including the largest estimated SoC for each route as the driving route to save on fuel costs or the charging fee and a method thereof.

Another aspect of the present disclosure provides an apparatus of generating a route to calculate a slope of the road for each link, based on an altitude of the road for each link, and reflect the slope of the road for each link in calculating an estimated amount of battery consumption for each link or an estimated amount of electrical energy recovery for each link to more accurately calculate an estimated SoC for each route and a method thereof.

Another aspect of the present disclosure provides an apparatus of generating a route to calculate an estimated parking fee, based on a parking fee of a parking lot near a destination, compare the estimated parking fee with an estimated battery charging fee, and notify the user of the compared result to save on vehicle operation costs of the user and a method thereof.

Another aspect of the present disclosure provides an apparatus of generating a route to reflect a road preference of the user for a scale, a function, or the like of the road in determining a driving route or reflect one of a location of an attraction or an estimated stop time for the attraction in determining the driving route to improve driving satisfaction of the user and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of generating a route may include a communication device that receives at least one of location information of a vehicle, map information, destination information, or a desired arrival time of a user, a route generator that generates one or more candidate routes, based on at least one of the location information, the map information, or the destination information, a calculation device that calculates at least one of an estimated arrival time for each route or an estimated state of charge (SoC) for each route with respect to respective candidate routes included in the one or more candidate routes, based on at least one of the map information or the one or more candidate routes, a driving route determination device that determines a driving route, based on at least one of the one or more candidate routes, the estimated arrival time for each route, the desired arrival time, or the estimated SoC for each route, and an interface that guides the user along the driving route.

In an exemplary embodiment of the present disclosure, the calculation device may calculate at least one of an estimated time for each link, an estimated amount of battery consumption for each link, or an estimated amount of electrical energy recovery for each link with respect to links making up the respective candidate routes, based on at least one of the map information or the one or more candidate routes, and may calculate at least one of the estimated arrival time for each route or the estimated SoC for each route, based on at least one of the estimated time for each link, the estimated amount of battery consumption for each link, or the estimated amount of electrical energy recovery for each link.

In an exemplary embodiment of the present disclosure, the calculation device may calculate the estimated arrival time for each route, based on at least one of a value obtained by adding the estimated time for each link for each candidate route or a current time.

In an exemplary embodiment of the present disclosure, the calculation device may calculate the estimated SoC for each route, based on at least one of a value obtained by adding the estimated amount of battery consumption for each link for each candidate route, a value obtained by adding the estimated amount of electrical energy recovery for each link for each candidate route, or a current SOC value of the vehicle.

In an exemplary embodiment of the present disclosure, the driving route determination device may determine a candidate route, including a largest estimated SoC for each route among the respective candidate routes where a difference between the estimated arrival time for each route and the desired arrival time is less than a predetermined time period, as the driving route.

In an exemplary embodiment of the present disclosure, the map information may include at least one of a traffic situation for each link, a vehicle average speed for each link, or a speed limit for each link. The calculation device may calculate at least one of the estimated time for each link, the estimated amount of battery consumption for each link, or the estimated amount of electrical energy recovery for each link, based on at least one of the traffic situation for each link, the vehicle average speed for each link, the speed limit for each link, or the one or more candidate routes.

In an exemplary embodiment of the present disclosure, the map information may include an altitude of a road for each link. The calculation device may calculate a slope of the road for each link, based on the altitude of the road for each link, and may calculate at least one of the estimated amount of battery consumption for each link or the estimated amount of electrical energy recovery for each link, according to at least one of the slope of the road for each link or the one or more candidate routes.

In an exemplary embodiment of the present disclosure, the apparatus may further include a controller that is configured to control at least one of a motor or a braking device of the vehicle, according to at least one of the estimated amount of battery consumption for each link or the estimated amount of electrical energy recovery for each link with respect to links making up respective driving routes.

In an exemplary embodiment of the present disclosure, the destination information may include information related to at least one of a location of a parking lot near to a destination of the vehicle or a parking fee of the parking lot. The communication device may further receive information related to a battery charging fee of the vehicle. The calculation device may calculate an estimated battery charging fee, based on at least one of a current SOC value of the vehicle, an estimated SoC for the driving route, or the battery charging fee, may calculate an estimated parking fee, based on one of the desired arrival time or the parking fee, and may generate information notifying the user of the estimated parking fee, in accordance with a result of comparing the estimated battery charging fee with the estimated parking fee.

In an exemplary embodiment of the present disclosure, the communication device may further receive information related to a road preference of the user for one of a scale or a function of a road. The route generator may generate the one or more candidate routes, based on at least one of the information related to the road preference, the location information, the map information, or the destination information.

In an exemplary embodiment of the present disclosure, the communication device may further receive attraction information including at least one of a location of an attraction located near the vehicle or a destination or an estimated stop time for the attraction. The route generator may generate the one or more candidate routes, based on at least one of the attraction information, the location information, the map information, or the destination information.

According to another aspect of the present disclosure, a method for generating a route may include receiving, by a communication device, at least one of location information of a vehicle, map information, destination information, or a desired arrival time of a user, generating, by a route generator, one or more candidate routes, based on at least one of the location information, the map information, or the destination information, calculating, by a calculation device, at least one of an estimated arrival time for each route or an estimated SoC for each route with respect to respective candidate routes included in the one or more candidate routes, based on at least one of the map information or the one or more candidate routes, determining, by a driving route determination device, a driving route, based on at least one of the one or more candidate routes, the estimated arrival time for each route, the desired arrival time, or the estimated SoC for each route, and guiding, by the interface, the user along the driving route.

In an exemplary embodiment of the present disclosure, the calculating may include calculating, by the calculation device, at least one of an estimated time for each link, an estimated amount of battery consumption for each link, or an estimated amount of electrical energy recovery for each link with respect to links making up the respective candidate routes, based on at least one of the map information or the one or more candidate routes, and calculating, by the calculation device, at least one of the estimated arrival time for each route or the estimated SoC for each route, based on at least one of the estimated time for each link, the estimated amount of battery consumption for each link, or the estimated amount of electrical energy recovery for each link.

In an exemplary embodiment of the present disclosure, the calculating of at least one of the estimated arrival time for each route or the estimated SoC for each route, based on at least one of the estimated time for each link, the estimated amount of battery consumption for each link, or the estimated amount of electrical energy recovery for each link may include calculating, by the calculation device, the estimated arrival time for each route, based on at least one of a value obtained by adding the estimated time for each link for each candidate route or a current time.

In an exemplary embodiment of the present disclosure, the calculating of at least one of the estimated arrival time for each route or the estimated SoC for each route, based on at least one of the estimated time for each link, the estimated amount of battery consumption for each link, or the estimated amount of electrical energy recovery for each link may include calculating, by the calculation device, the estimated SoC for each route, based on at least one of a value obtained by adding the estimated amount of battery consumption for each link for each candidate route, a value obtained by adding the estimated amount of electrical energy recovery for each link for each candidate route, or a current SOC value of the vehicle.

In an exemplary embodiment of the present disclosure, the determining of the driving route may include determining, by the driving route determination device, a candidate route, including a largest estimated SoC for each route among the respective candidate routes where a difference between the estimated arrival time for each route and the desired arrival time is less than a predetermined time period, as the driving route.

In an exemplary embodiment of the present disclosure, the map information may include at least one of a traffic situation for each link, a vehicle average speed for each link, or a speed limit for each link. The calculating of at least one of the estimated arrival time for each route or the estimated SoC for each route, based on at least one of the estimated time for each link, the estimated amount of battery consumption for each link, or the estimated amount of electrical energy recovery for each link may include calculating, by the calculation device, at least one of the estimated time for each link, the estimated amount of battery consumption for each link, or the estimated amount of electrical energy recovery for each link, based on at least one of the traffic situation for each link, the vehicle average speed for each link, the speed limit for each link, or the one or more candidate routes.

In an exemplary embodiment of the present disclosure, the map information may include an altitude of a road for each link. The calculating of at least one of the estimated time for each link, the estimated amount of battery consumption for each link, or the estimated amount of electrical energy recovery for each link may include calculating, by the calculation device, a slope of the road for each link, based on the altitude of the road for each link, and calculating, by the calculation device, at least one of the estimated amount of battery consumption for each link or the estimated amount of electrical energy recovery for each link, according to at least one of the slope of the road for each link or the one or more candidate routes.

In an exemplary embodiment of the present disclosure, the method may further include controlling, by a controller, at least one of a motor or a braking device of the vehicle, according to at least one of the estimated amount of battery consumption for each link or the estimated amount of electrical energy recovery for each link with respect to links making up respective driving routes.

In an exemplary embodiment of the present disclosure, the destination information may include information related to at least one of a location of a parking lot near to a destination of the vehicle or a parking fee of the parking lot. The receiving may include receiving, by the communication device, information related to a battery charging fee of the vehicle. The calculating may include calculating, by the calculation device, an estimated battery charging fee, based on one of a current SOC value of the vehicle, an estimated SoC for the driving route, or the battery charging fee, calculating, by the calculation device, an estimated parking fee, based on at least one of the desired arrival time or the parking fee, and generating, by the calculation device, information notifying the user of the estimated parking fee, in accordance with a result of comparing the estimated battery charging fee with the estimated parking fee.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, and FIG. 5.

Figure 1:
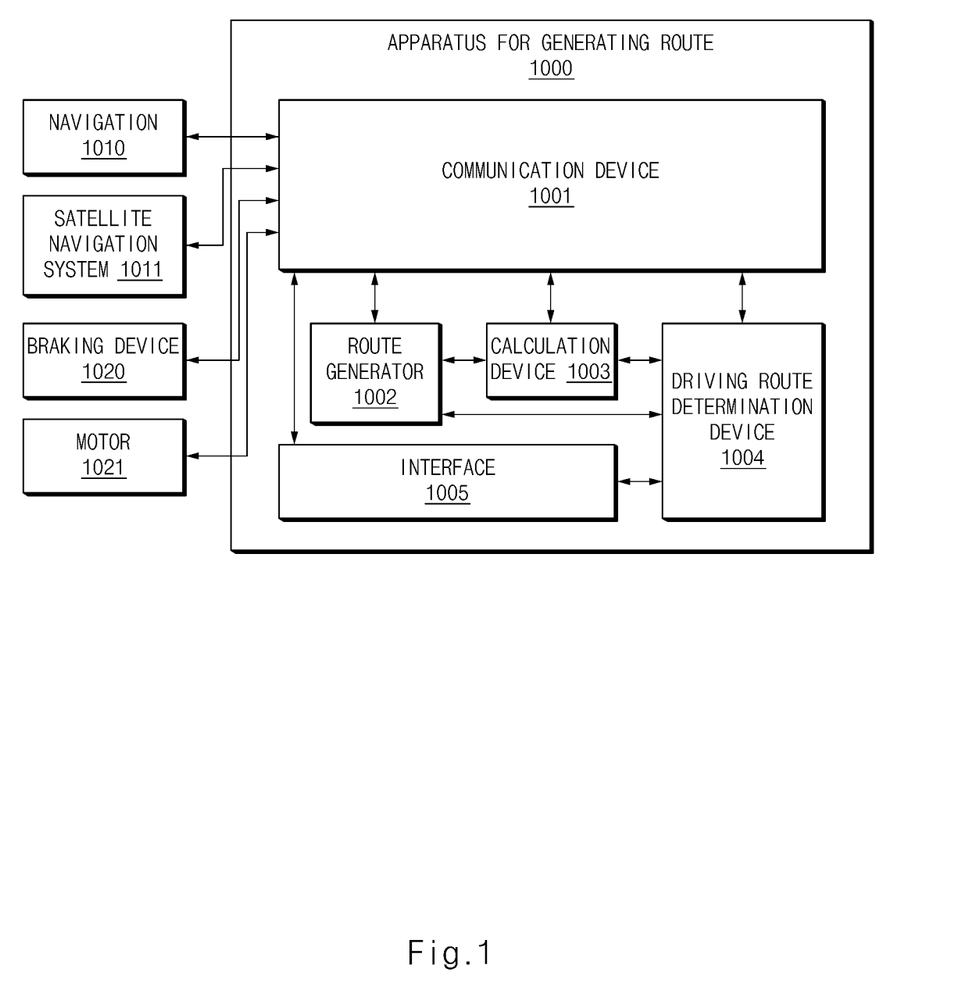
FIG. 1 is a drawing illustrating an apparatus of generating a route according to an exemplary embodiment of the present disclosure.

FIG. 1 is a drawing illustrating an apparatus 1000 for generating a route according to an exemplary embodiment of the present disclosure.

The apparatus 1000 for generating the route according to an exemplary embodiment of the present disclosure may include a communication device 1001, a route generator 1002, a calculation device 1003, a driving route determination device 1004, and an interface 1005.

Furthermore, the apparatus 1000 for generating the route according to an exemplary embodiment of the present disclosure may include one or more elements which are not illustrated in the drawing.

The apparatus 1000 for generating the route according to an exemplary embodiment of the present disclosure may be provided in a vehicle (hereinafter, the vehicle including the apparatus 1000 for generating the route according to various exemplary embodiments is referred to as a "host vehicle").

Herein, the host vehicle may include, but is not limited to, one of an electric vehicle (EV), a hybrid electric vehicle (HEV), a hydrogen electric vehicle, a plug-in hybrid electric vehicle (PHEV), or an internal combustion engine vehicle.

The apparatus 1000 for generating the route according to various exemplary embodiments of the present disclosure may include the communication device 1001.

Herein, the communication device 1001 may use, but is not limited to, a communication scheme such as a local interconnect network (LIN), a controller area network (CAN), a FlexRay communication bus, media oriented systems transport (MOST), dedicated short range communication (DSRC), cellular vehicle-to-everything (C-V2X), Wi-Fi, wireless broadband (WiBro), or worldwide interoperability for microwave access (WiMAX).

The communication device 1001 may communicate with one of the route generator 1002, the calculation device 1003, the driving route determination device 1004, or the interface 1005 to transmit or receive information.

Furthermore, the communication device 1001 may receive one of location information of the host vehicle, map information, destination information, a desired arrival time of a user, information related to a battery charging fee of the host vehicle, information related to a road preference of the user for one of a scale of the road or a function of the road, or attraction information including one of a location of an attraction located near to the host vehicle or a destination or an estimated stop time for the attraction.

Herein, the location information of the host vehicle may be information related to a place in which the host vehicle is currently located, which may be received in the communication device 1001 from a navigation 1010 or a satellite navigation system 1011 or may be input by the user through the interface 1005.

Herein, the map information may include one of a traffic situation for each link, a vehicle average speed for each link, a speed limit for each link, or an altitude of a road for each link, as well as information related to a road on which the vehicle is able to travel, traffic lights, and a structure.

The destination information may include information related to one of a location of a destination, a location of a parking lot near to the destination, or a parking fee of the parking lot.

Herein, the destination may include a location which is a current location of the host vehicle and is a location where the user wants to return after a certain time or a location which is a location input by the user and is a location where the user wants to arrive after a certain time.

For example, the destination may include the current location of the host vehicle.

The desired arrival time of the user may include a time when the user wants to arrive at the destination and may be represented as a time after a certain time from the current time.

The scale of the road may include a criterion where a type of the road included in the map is divided into classes 1-3 of the wide road, classes 1-3 of the large road, classes 1-3 of the middle road, or classes 1-3 of the small road and may include a criterion where the type of the road is divided into the alley or the large road.

The function of the road may include a criterion where the type of the road included in the map is divided into the general road, the limited-access road, the national expressway, or the urban expressway.

The attraction located near to the host vehicle or the destination may include a place where the user is able to tour before he or she arrives at the destination in the desired arrival time. The user may pass through the attraction before arriving at the destination.

For example, the attraction may include a historical site, a street, a tourist spot, a department store, a movie theater, an exercise place, or the like.

The estimated stop time for the attraction may include a time expected that the user will stay at the attraction.

The estimated stop time for the attraction may be set by the user, may be set by being learned by machine learning, or may be set based on an average staying time when the user stays at the attraction.

For example, the estimated stop time for the attraction may include one hour which is an average staying time when users who visit any tourist spot stay at the tourist spot.

For another example, the estimated stop time for the attraction may include a start time and an end time of a movie showing at a movie theater near to the destination.

Meanwhile, the communication device 1001 may communicate with one of the navigation 1010, the satellite navigation system 1011, a braking device 1020, or a motor 1021.

Herein, the navigation 1010 may include a navigation system provided in the host vehicle or may include a navigation application provided in a portable device including a smartphone configured for communicating with the host vehicle or the apparatus 1000 for generating the route according to an exemplary embodiment of the present disclosure. The navigation 1010 may communicate with the satellite navigation system 1011, the communication device 1001, or the like.

The navigation 1010 may deliver a destination which is a location where the user wants to return or a location where the user wants to arrive to the communication device 1001.

Furthermore, the navigation 1010 may transmit one of the map information or the destination information to the communication device 1001.

The communication device 1001 may receive one of the map information or the destination information from the navigation 1010 and may deliver the received information to one of the route generator 1002, the calculation device 1003, the driving route determination device 1004, or the interface 1005.

The satellite navigation system 1011 may include a means configured for identifying a location of the host vehicle and may include, but is not limited to, a system for identifying a location of the host vehicle using a satellite, for example, a global positioning system (GPS), Galileo, a global navigation satellite system (GLONASS), Beidou, a Guasi-Zenith satellite system (QZSS), or an Indian regional navigational satellite system (IRNSS).

The satellite navigation system 1011 may transmit location information of the host vehicle to the communication device 1001.

The communication device 1001 may receive the location information of the host vehicle from the satellite navigation system 1011 and may deliver the received location information to one of the route generator 1002, the calculation device 1003, the driving route determination device 1004, or the interface 1005.

The braking device 1020 may be a device provided in the host vehicle, which may include a device which performs a function associated with braking of the host vehicle.

In detail, the braking device 1020 may include a brake system including a regenerative braking co-operative controller provided in the host vehicle.

The braking device 1020 may control braking of the host vehicle, based on the estimated amount of battery consumption for each link, the estimated amount of electrical energy recovery for each link, or the like with respect to links making up respective driving routes from the communication device 1001.

In detail, the braking device 1020 may control braking of the host vehicle to minimize the estimated amount of battery consumption for each link while the host vehicle is traveling along the driving route and maximize the estimated amount of electrical energy recovery for each link, thus controlling the braking of the host vehicle to maximize an estimated state of charge (SoC) for each route for the driving route.

The motor 1021 may be a device provided in the host vehicle, which may include a device which performs generating power configured for driving the host vehicle.

For example, when the host vehicle is an electric vehicle or the like which is driven using electrical energy, the motor 1021 may include an electric motor.

For another example, when the host vehicle is an internal combustion engine vehicle which utilizes energy produced using gasoline, diesel, or the like, the shown motor 1021 may be replaced with an engine.

The motor 1021 may receive one of the estimated amount of battery consumption for each link or the estimated amount of electrical energy recovery for each link with respect to links making up respective driving routes from the communication device 1001 and may control driving of the host vehicle, based on the estimated amount of battery consumption for each link, the estimated amount of electrical energy recovery for each link with respect to the links, or the like.

In detail, the motor 1021 may control driving of the host vehicle to minimize the estimated amount of battery consumption for each link while the host vehicle is traveling along the driving route and maximize the estimated amount of electrical energy recovery for each link, thus controlling the driving of the host vehicle to maximize the estimated SOC for each route for the driving route.

The apparatus 1000 for generating the route according to various exemplary embodiments of the present disclosure may include the route generator 1002.

The route generator 1002 may receive one of location information, map information, destination information, information related to a road preference, or attraction information from the communication device 1001.

The route generator 1002 may generate one or more candidate routes, based on one of the location information, the map information, or the destination information.

Herein, the candidate routes may include all routes where it is possible for the host vehicle to travel from the current position of the host vehicle to the destination.

For example, the candidate routes do not necessarily include only a route with the shortest time or the shortest distance among routes from the current location of the host vehicle to the destination, and may include a route generated without special restrictions about time or distance.

For another example, when the destination is the same as the current location of the host vehicle, the candidate routes may include a route which returns to the current location of the host vehicle again.

For another example, when the host vehicle travels from the current location of the host vehicle to the destination and when there is a road where the host vehicle repeatedly travels (e.g., frequently used or preferred), the candidate routes may include a route including the road.

Furthermore, the route generator 1002 may generate several different candidate routes where the host vehicle travels from the current location of the host vehicle to the destination.

Furthermore, the route generator 1002 may generate one or more candidate routes, based on one of the information for the road preference, the location information, the map information, or the destination information.

For example, when the user inputs information related to a road preference, which indicates that he or she does not want to travel on an alley, the route generator 1002 may fail to generate a route including a route where the host vehicle travels on the alley as a candidate route.

For another example, when the user inputs information related to a road preference, which indicates that he or she does not want to travel on a highway, the route generator 1002 may fail to generate a route including a route where the host vehicle travels on the highway as a candidate route.

Accordingly, it is obvious that a technical feature where the route generator 1002 generates the driving route by reflecting the information related to the road preference is applicable to when various preferences for a scale, a function, or the like of the road are reflected.

Furthermore, the route generator 1002 may generate one or more candidate routes, based on one of the attraction information, the location information, the map information, or the destination information.

For example, when there is a historical site near to the destination, the route generator 1002 may include one of routes where the host vehicle arrives at the destination through the historical site in several candidate routes.

For example, when there is a movie theater near to the destination, the route generator 1002 may include one of routes where the host vehicle arrives at the destination through the movie theater in several candidate routes.

The route generator 1002 may deliver the one or more generated candidate routes to the communication device 1001, the calculation device 1003, the driving route determination device 1004, the interface 1005, or the like.

The apparatus 1000 for generating the route according to various exemplary embodiments of the present disclosure may include the calculation device 1003.

The calculation device 1003 may receive one of the map information, the one or more candidate routes, the estimated time for each link, the estimated amount of battery consumption for each link, the estimated amount of electrical energy recovery for each link, a current SOC value of the host vehicle, the traffic situation for each link, the vehicle average speed for each link, the speed limit for each link, the altitude of the road for each link, the desired arrival time, or the parking fee of the parking lot near to the destination from the communication device 1001, the route generator 1002, or the like.

The calculation device 1003 may calculate one of an estimated arrival time for each route or an estimated SoC for each route with respect to respective candidate routes included in the one or more candidate routes, based on one of the map information or the one or more candidate routes.

The calculation device 1003 may deliver the generated estimated arrival time for each route, the generated estimated SoC for each route with respect to the respective candidate routes, or the like to the communication device 1001, the route generator 1002, the driving route determination device 1004, the interface 1005, or the like.

Detailed contents where the calculation device 1003 calculates the one of the estimated arrival time for each route or the estimated SoC for each route with respect to the respective candidate routes and another technical feature performed by the calculation device 1003 will be described in detail in a description of FIG. 2, FIG. 3 and FIG. 4.

The apparatus 1000 for generating the route according to various exemplary embodiments of the present disclosure may include the driving route determination device 1004.

The driving route determination device 1004 may receive one of the one or more candidate routes, the estimated arrival time for each route, the desired arrival time, or the estimated SoC for each route to the communication device 1001, the route generator 1002, the calculation device 1003, the interface 1005, or the like.

The driving route determination device 1004 may determine a driving route, based on the one or more candidate routes, the estimated arrival time for each route, the desired arrival time, or the estimated SoC for each route.

The driving route determination device 1004 may deliver the determined driving route or the like to the communication device 1001, the route generator 1002, the calculation device 1003, the interface 1005, or the like.

Detailed contents where the driving route determination device 1004 determines the driving route and another technical feature configured for being performed by the driving route determination device 1004 will be described in detail in a description of FIG. 2, FIG. 3 and FIG. 4.

The apparatus 1000 for generating the route according to various exemplary embodiments of the present disclosure may include the interface 1005.

The interface 1005 may receive the driving route from the driving route determination device 1004.

The interface 1005 may guide the user along the driving route.

In detail, the interface 1005 may output one of an image or a voice to guide the user along the driving route.

The interface 1005 may receive destination information, a desired arrival time of the user, or information related to a road preference of the user for one of a scale or a function of the road, by one of a touch input, a button input, or a voice input, and may deliver the received information to the communication device 1001, the route generator 1002, the calculation device 1003, or the driving route determination device 1004.

Accordingly, the apparatus 1000 for generating the route and the method thereof according to various exemplary embodiments of the present disclosure may determine a driving route where the user arrives at the destination to suit the desired arrival time and may guide the user along the driving route, thus improving the convenience of the user.

Figure 2:
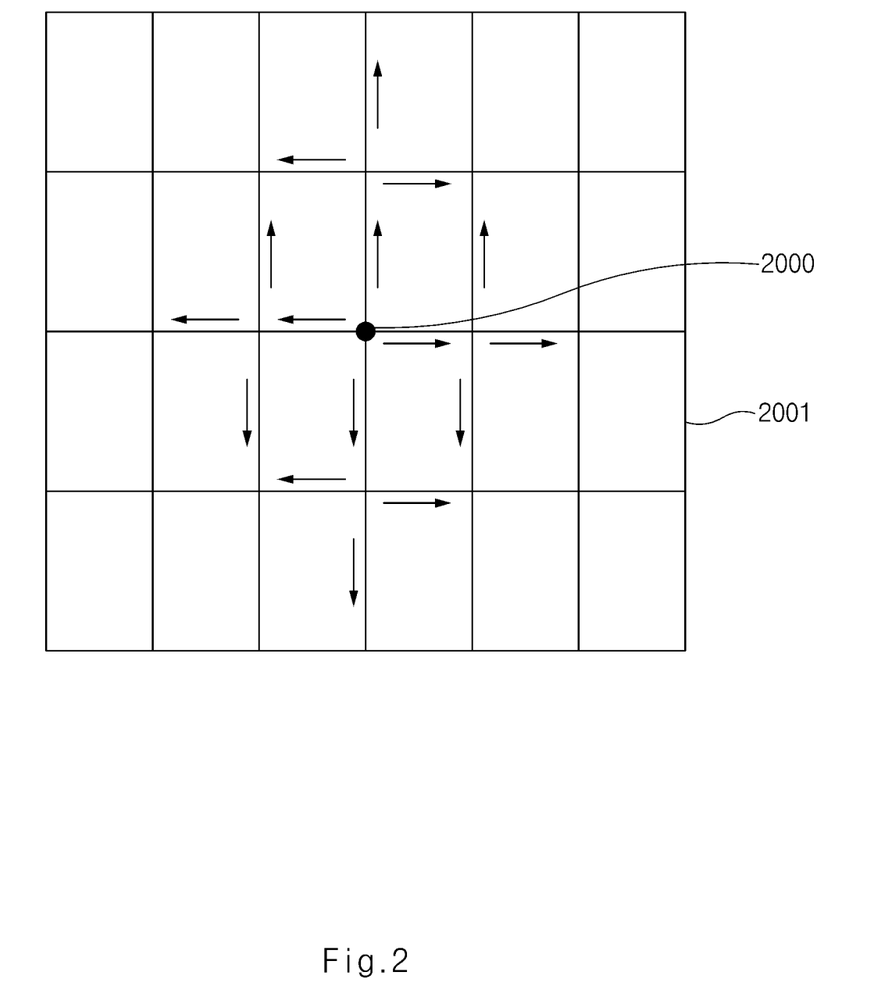
FIG. 2 is a drawing illustrating an example of a link provided to determine a driving route, depending on an apparatus of generating a route and a method thereof according to an exemplary embodiment of the present disclosure.

FIG. 2 is a drawing illustrating an example of a link 2001 provided to determine a driving route, depending on an apparatus (e.g., 1000 of FIG. 1) for generating a route and a method thereof according to an exemplary embodiment of the present disclosure.

To calculate an estimated arrival time for each route or an estimated SoC for each route, a calculation device (e.g., 1003 of FIG. 1) may calculate one of an estimated time for each link, an estimated amount of battery consumption for each link, or an estimated amount of electrical energy recovery for each link with respect to links 2001 making up respective candidate routes.

Furthermore, the calculation device may calculate one of an estimated time for each link, an estimated amount of battery consumption for each link, or an estimated amount of electrical energy recovery for each link, based on one of a traffic situation for each link, a vehicle average speed for each link, a speed limit for each link, or one or more candidate routes.

Furthermore, the calculation device may calculate one of an estimated arrival time for each route or an estimated SoC for each route, based on one of the estimated time for each link, the estimated amount of battery consumption for each link, or the estimated amount of electrical energy recovery for each link.

Herein, the link 2001 may refer to a minimum unit of the road.

In detail, a node may include a location expressing a point where a change in speed occurs or the like when a vehicle travels on the road from a traffic point of view, and the link 2001 may express a road connecting between nodes.

For example, the node may include an intersection, a traffic control point including a tollgate, a road structure transition point including a tunnel, a bridge, an overpass, or an underpass, an inter change (IC), a junction (JC), a road operation transition point including a lane number change point on the road, or the like, and the link 2001 may be expressed as a road center line connecting the node with the node.

Meanwhile, information related to the links 2001 making up respective candidate routes may be included in map information.

As shown in FIG. 2, a road connecting a node where the host vehicle 2000 is located with a node adjacent to the node where the host vehicle 200 is located and the link 2001 connecting a node adjacent to the host vehicle 2000 with a node adjacent to the node adjacent to the host vehicle 2000 may be expressed around the host vehicle 2000.

In FIG. 2, it is expressed that the four links 2001 are connected to the host vehicle 2000 of the current location, and this is only one of examples for helping understanding.

The number of the links 2001 connected to the host vehicle 2000 may be greater than or less than four according to the direction of the road where the host vehicle 2000 of the current location is able to travel, the nature of the road, or the like.

Figure 3A:
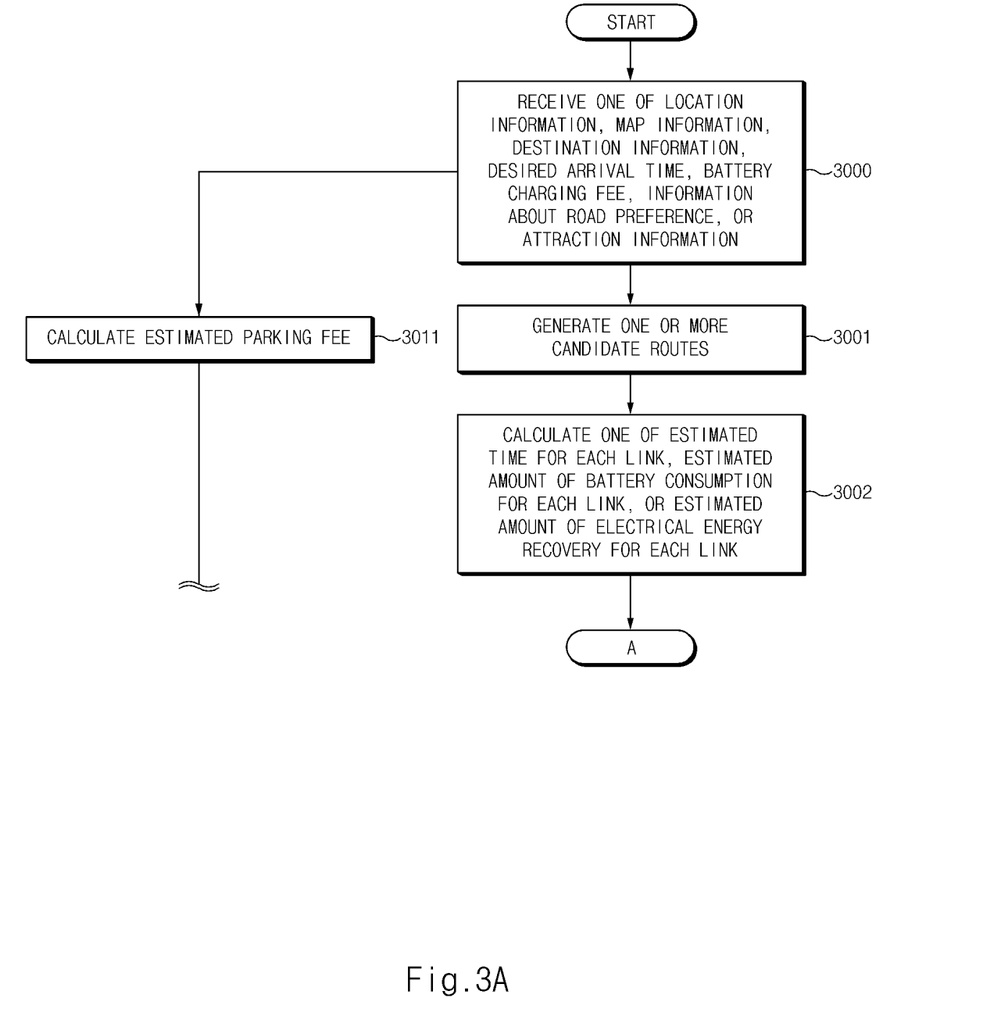
FIG. 3A and FIG. 3B are drawings illustrating an example of determining a driving route, notifying a user of information associated with the determined result, and controlling a vehicle, depending on an apparatus of generating a route and a method thereof according to an exemplary embodiment of the present disclosure.
Figure 3B:
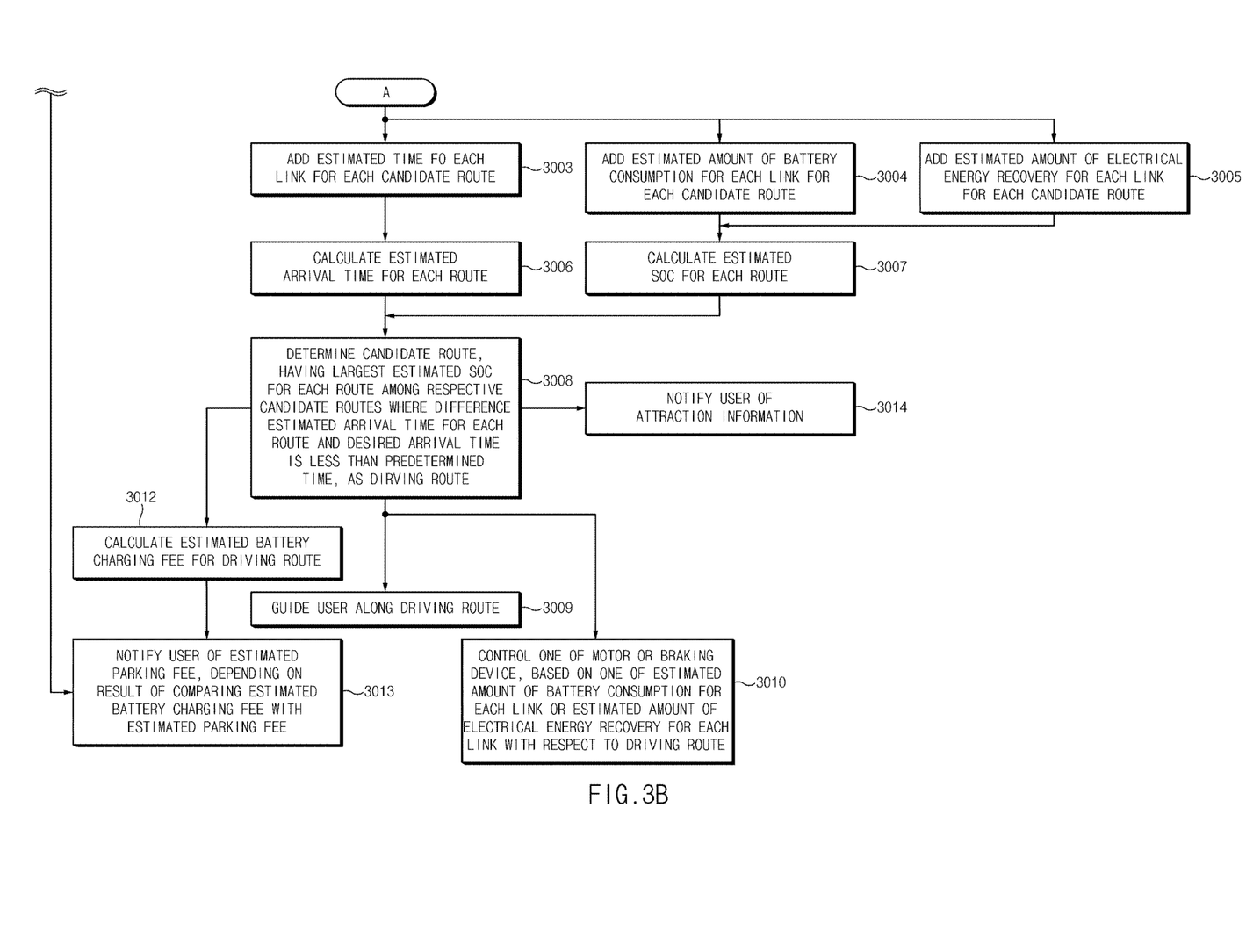

FIG. 3A and FIG. 3B are drawings illustrating an example of determining a driving route, notifying a user of information associated with the determined result, and controlling a host vehicle, depending on an apparatus (e.g., 1000 of FIG. 1) for generating a route and a method thereof according to an exemplary embodiment of the present disclosure.

Figure 4:
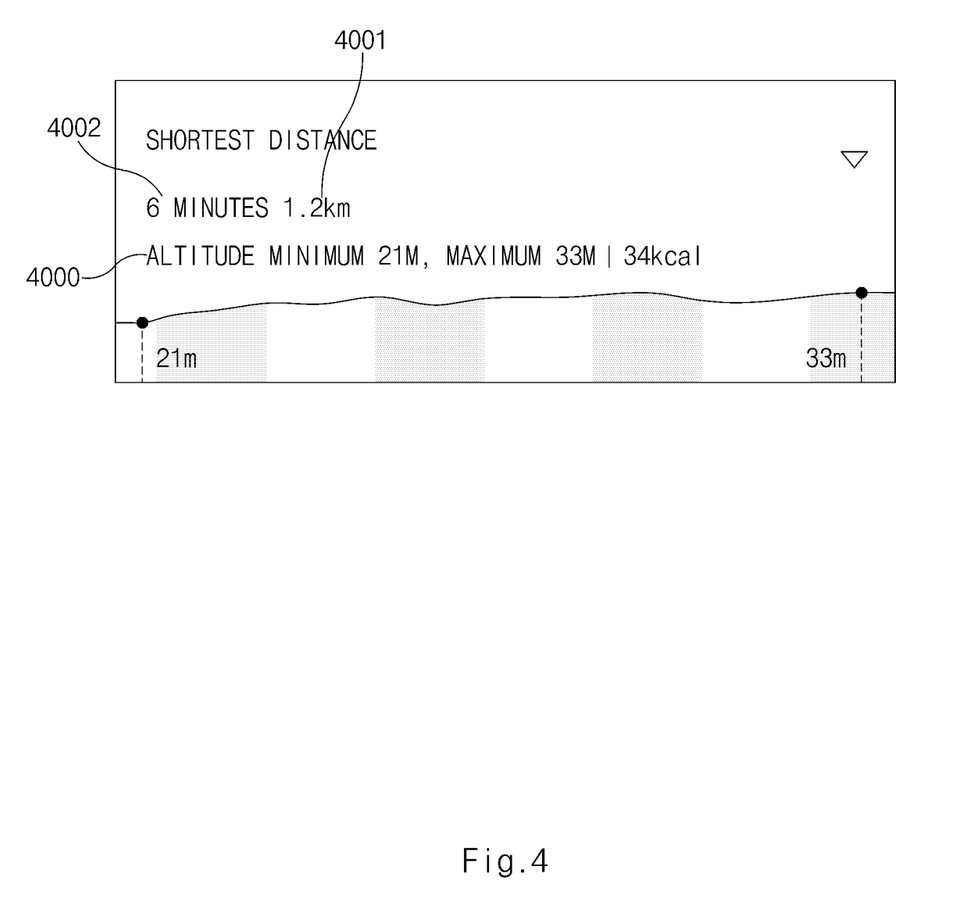
FIG. 4 is a drawing illustrating an example of map information including an altitude of a road provided to determine a driving route, depending on an apparatus of generating a route and a method thereof according to an exemplary embodiment of the present disclosure.

FIG. 4 is a drawing illustrating an example of map information including an altitude of a road provided to determine a driving route, depending on an apparatus of generating a route and a method thereof according to an exemplary embodiment of the present disclosure.

A communication device (e.g., 1001 of FIG. 1) may receive location information, map information, destination information, a desired arrival time, information related to a battery charging fee of a host vehicle, information related to a road preference of a user, attraction information including one of a location of an attraction near to the host vehicle or a destination or an estimated stop time for the attraction, or the like in operation 3000 and may deliver the received information to one of a route generator (1002 of FIG. 1), a calculation device (e.g., 1003 of FIG. 1), a driving route determination device (e.g., 1004 of FIG. 1), or an interface (1005 of FIG. 1).

In operation 3001, the route generator may generate one or more candidate routes, based on one of the location information, the map information, or the destination information.

Furthermore, in operation 3001, the route generator may generate the one or more candidate routes, based on one of the information related to the road preference, the location information, the map information, or the destination information.

Furthermore, in operation 3001, the route generator may generate the one or more candidate routes, based on one of the attraction information, the location information, the map information, or the destination information.

In operation 3002, the calculation device may calculate one of an estimated time for each link, an estimated amount of battery consumption for each link, or an estimated amount of electrical energy recovery for each link, based on one of a traffic situation for each link, a vehicle average speed for each link, a speed limit for each link, or the one or more candidate routes.

For example, when it is unable to normally use one lane because an accident occurs in a specific link making up a specific candidate route, in operation 3002, the calculation device may reflect that it is unable to use the lane to calculate an estimated time it will take for the host vehicle to pass through the link.

For another example, in operation 3002, the calculation device may calculate an estimated amount of battery consumption expected to be consumed for the host vehicle to pass through the link, based on a speed limit and a vehicle average speed of a specific link making up a specific candidate route, and may calculate an amount of electrical energy recovery expected to be recovered through regenerative braking, while the host vehicle passes through the link.

Furthermore, in operation 3002, the calculation device may calculate a slope of the road for each link, based on an altitude 4000 of the road for each link, and may calculate one of an estimated amount of battery consumption for each link or an estimated amount of electrical energy recovery for each link, based on one of the slope of the road for each link or the one or more candidate routes.

For example, in operation 3002, the calculation device may calculate a slope of the road for a specific link making up a specific candidate route, based on the altitude 4000 of the link, a length 4001 of the link, and an estimated time 4002 it will take to pass through the link, and may calculate an estimated amount of battery consumption expected to be consumed for the host vehicle to pass through the link or an estimated amount of electrical energy recovery expected to be recovered through regenerative braking, while the host vehicle passes through the link, based on the calculated slope of the road for the link.

In operations 3003 and 3006, the calculation device may calculate an estimated arrival time for each route, based on one of a value obtained by adding the estimated time for each link for each candidate route or a current time.

For example, in operation 3003, the calculation device may add the estimated time for each link for one or more links making up respective candidate routes with respect to all links making up the candidate route and may perform such addition for each candidate route. In operation 3006, the calculation device may calculate an estimated arrival time for each route with respect to the respective candidate routes.

For another example, when calculating an estimated arrival time for each route with respect to a candidate route via an attraction, in operation 3006, the calculation device may reflect an estimated stop time for the attraction in the addition to calculate the estimated arrival time for each route with respect to the candidate route via the attraction.

Accordingly, the apparatus of generating the route and the method thereof according to various exemplary embodiments of the present disclosure may generate one or more candidate routes and may determine a driving route and may calculate an estimated arrival time for each route, based on an estimated time for each route with respect to respective candidate routes, thus improving efficiency and predictability for time management of the user.

Meanwhile, in operations 3004, 3005, and 3007, the calculation device may calculate an estimated SoC for each route, based on one of a value obtained by adding the estimated amount of battery consumption for each route, a value obtained by adding the estimated amount of electrical energy recovery for each route, or a current SOC value of the host vehicle.

For example, in operations 3004 and 3005, the calculation device may calculate a value, obtained by subtracting a value obtained by adding the estimated amount of electrical energy recovery for each route from a value obtained by adding the estimated amount of battery consumption for each route with respect to one or more links making up respective candidate routes, as an estimated SoC for the candidate route, which is a value reduced from an SoC when the host vehicle starts the candidate route, when the host vehicle completes the candidate route, and may perform such determination for each candidate route. In operation 3007, the calculation device may calculate an estimated SoC for each route for each candidate route.

In operation 3008, the driving route determination device may determine a candidate route, including the largest estimated SoC for each route among respective candidate routes where a difference between the estimated arrival time for each route and the desired arrival time is less than a predetermined time period, as the driving route.

Herein, the predetermined time period may be set by the user, may be set by being learned by machine learning, or may be set based on information related to satisfaction of the user about the predetermined time period.

Accordingly, the apparatus of generating the route and the method thereof according to various exemplary embodiments of the present disclosure may calculate an estimated SoC for each route, based on one of the estimated amount of battery consumption for each link or the estimated amount of electrical energy recovery for each link and may determine a candidate route including the largest estimated SoC for each route as the driving route, thus saving on the fuel costs or charging fee the user should consume.

In operation 3009, the interface may guide the user along the determined driving route.

Furthermore, when the candidate route in which attraction information is reflected is determined as the driving route, in operation 3014, when guiding the user along the driving route, the interface may notify the user of the fact that the driving route is a driving route via the attraction, information related to the attraction, or the like together.

Accordingly, the apparatus of generating the route and the method thereof according to various exemplary embodiments of the present disclosure may reflect one of a location of the attraction or an estimated stop time for the attraction in determining the driving route, thus improving driving satisfaction of the user.

Meanwhile, in operation 3011, the calculation device may calculate an estimated parking fee, based on one of the desired arrival time or the parking fee.

For example, in operation 3011, the calculation device may calculate the estimated parking fee by multiplying a parking fee per hour in a parking lot near to the destination by a difference between the desired arrival time and the current time.

Furthermore, in operation 3012, the calculation device may calculate an estimated battery charging fee, based on one of the current SOC value of the host vehicle, the estimated SoC for the driving route, or the battery charging fee.

Furthermore, in operation 3012, the calculation device may calculate a difference between the current SOC value of the host vehicle and the estimated SoC for the driving route and may multiply the difference by a battery charging fee per rechargeable battery capacity, thus calculating the estimated battery charging fee.

In operation 3013, the calculation device may generate information notifying the user of one of the estimated parking fee or the estimated battery charging fee, in accordance with a result of comparing the estimated battery charging fee with the estimated parking fee.

The interface may notify the user of one of the estimated parking fee or the estimated battery charging fee.

For example, when the estimated parking fee is lower than the estimated battery charging fee, the interface may notify the user of the fact that the estimated parking fee is lower than the estimated battery charging fee.

For another example, when the estimated parking fee is the same as or similar to the estimated battery charging fee, the interface may notify the user of the fact that the estimated parking fee is the same as or similar to the estimated battery charging fee, may receive whether to park the host vehicle in the parking lot until the desired arrival time or whether to receive the driving route from the user, and may deliver it to the communication device or the like.

Meanwhile, in operation 3010, the apparatus of generating the route according to various exemplary embodiments of the present disclosure may further include a controller which is configured to control one of a motor or a braking device of the host vehicle, based on one of the estimated amount of battery consumption for each link or the estimated amount of electrical energy recovery for each link with respect to links making up respective driving routes.

Figure 5:
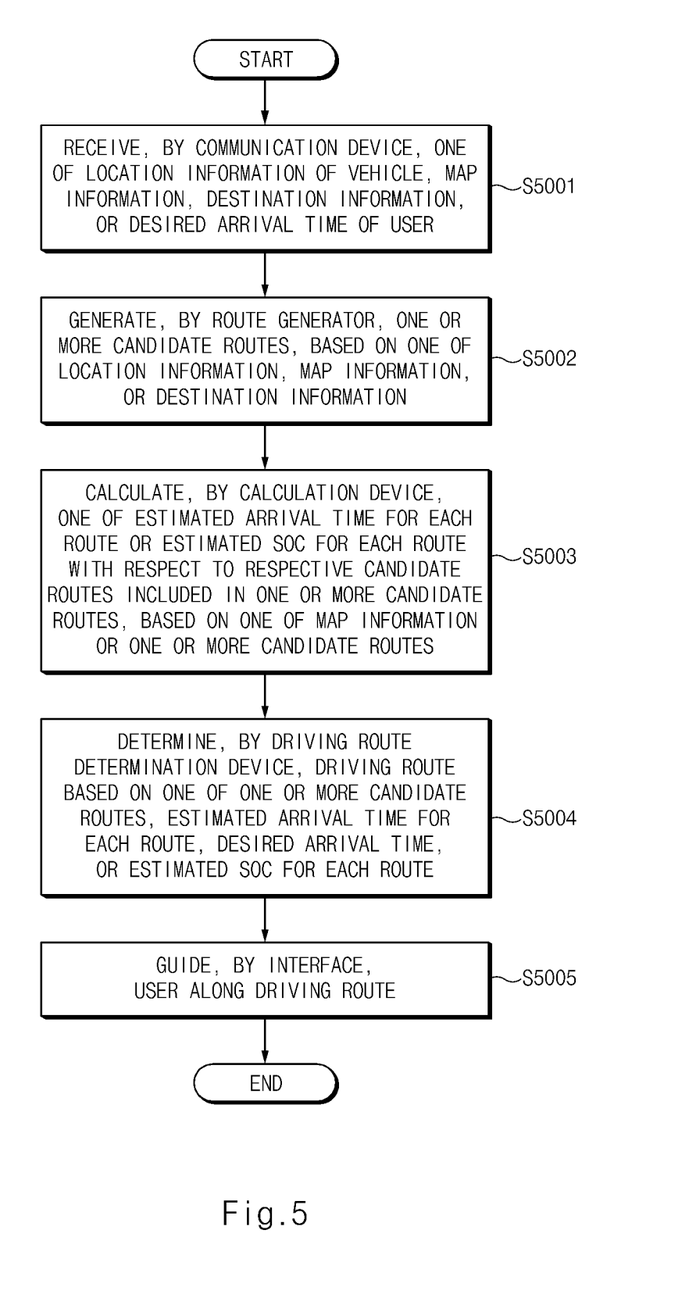
FIG. 5 is a drawing illustrating a method for generating a route according to an exemplary embodiment of the present disclosure.

FIG. 5 is a drawing illustrating a method for generating a route according to an exemplary embodiment of the present disclosure.

The apparatus (e.g., 1000 of FIG. 1) for generating the route according to various exemplary embodiments of the present disclosure, which is described above with reference to FIG. 1, FIG. 2, FIG. 3, and FIG. 4, may perform a method described with reference to the drawing.

The method for generating the route according to various exemplary embodiments of the present disclosure may include receiving (S5001), by a communication device, one of location information of a host vehicle, map information, destination information, or a desired arrival time of a user, generating (S5002), by a route generator, one or more candidate route, based on one of the location information, the map information, or the destination information, calculating (S5003), by a calculation device, an estimated arrival time for each route or an estimated SoC for each route with respect to respective candidate routes included in the one or more candidate routes, based on one of the map information or the one or more candidate routes, determining (S5004), by a driving route determination device, a driving route, based on one of the one or more candidate routes, the estimated arrival time for each route, the desired arrival time, or the estimated SoC for each route, and guiding (S5005), by an interface, a user along the driving route.

Herein, the map information may include one of a traffic situation for each link, a vehicle average speed for each link, a speed limit for each link, or an altitude of a road for each link.

The destination information may include information related to one of a location of a parking lot near to a destination, or a parking fee of the parking lot.

S5001 may be performed by the communication device (e.g., 1001 of FIG. 1) described above with reference to FIG. 1, FIG. 2, FIG. 3, and FIG. 4.

S5001 may include receiving, by the communication device, information related to a battery charging fee of the host vehicle.

S5002 may be performed by the route generator (e.g., 1002 of FIG. 1) described above with reference to FIG. 1, FIG. 2, FIG. 3, and FIG. 4.

S5003 may be performed by the calculation device (e.g., 1003 of FIG. 1) described above with reference to FIG. 1, FIG. 2, FIG. 3, and FIG. 4.

S5003 may include one of the following operations i) to x).

First of all, S5003 may include i) calculating, by the calculation device, one of an estimated time for each link, an estimated amount of battery consumption for each link, or an estimated amount of electrical energy recovery for each link with respect to links making up the respective candidate routes, based on one of the map information or the one or more candidate routes.

Furthermore, S5003 may include ii) calculating, by the calculation device, one of the estimated arrival time for each route or the estimated SoC for each route, based on one of the estimated time for each link, the estimated amount of battery consumption for each link, or the estimated amount of electrical energy recovery for each link.

Furthermore, S5003 may include iii) calculating, by the calculation device, an estimated arrival time for each route, based on one of a value obtained by adding the estimated time for each link for each candidate route or a current time.

Furthermore, S5003 may include iv) calculating, by the calculation device, the estimated SoC for each route, based on one of the value obtained by adding the estimated amount of battery consumption for each link for each candidate route, a value obtained by adding the estimated amount of electrical energy recovery for each link for each candidate route, or a current SOC value of the host vehicle.

Furthermore, S5003 may include v) calculating, by the calculation device, one of an estimated time for each link, an estimated amount of battery consumption for each link, or an estimated amount of electrical energy recovery for each link, based on one of the traffic situation for each link, the vehicle average speed for each link, the speed limit for each link, or the one or more candidate routes.

Furthermore, S5003 may include vi) calculating, by the calculation device, a slope of a road for each link, based on an altitude of the road for each link.

Furthermore, S5003 may include vii) calculating, by the calculation device, one of an estimated amount of battery consumption for each link or an estimated amount of electrical energy recovery for each link, based on one of the slope of the road for each link or the one or more candidate routes.

Furthermore, S5003 may include viii) calculating, by the calculation device, an estimated battery charging fee, based on one of a current SOC value of the host vehicle, an estimated SoC for the driving route, or a battery charging fee.

Furthermore, S5003 may include ix) calculating, by the calculation device, an estimated parking fee, based on one of the desired arrival time or the parking fee.

Furthermore, S5003 may include x) generating, by the calculation device, information notifying the user of the estimated parking fee, in accordance with a result of comparing the estimated battery charging fee with the estimated parking fee.

S5004 may be performed by the driving route determination device (e.g., 1004 of FIG. 1) described above with reference to FIG. 1, FIG. 2, FIG. 3, and FIG. 4.

S5004 may include determining, by the driving route determination device, a candidate route, including the largest estimated SoC for each route among respective candidate routes where a difference between the estimated arrival time for each route and the desired arrival time is less than a predetermined time period, as the driving route.

S5005 may be performed by the interface (e.g., 1005 of FIG. 1) described above with reference to FIG. 1, FIG. 2, FIG. 3, and FIG. 4.

Meanwhile, the method for generating the route according to various exemplary embodiments of the present disclosure may further include controlling one of a motor or a braking device of the host vehicle, based on one of the estimated amount of battery consumption for each link or the estimated amount of electrical energy recovery for each link with respect to links making up respective driving routes.

A description will be provided of effects of the apparatus of generating the route and the method thereof according to an exemplary embodiment of the present disclosure.

The apparatus of generating the route and the method thereof according to an exemplary embodiment of the present disclosure may be provided to determine a driving route where the user arrives at a destination to suit a desired arrival time and guide the user along the driving route, thus improving the convenience of the user.

The apparatus of generating the route and the method thereof according to an exemplary embodiment of the present disclosure may be provided to generate one or more candidate routes, determine a driving route and calculate an estimated arrival time for each route, based on an estimated time for each link with respect to respective candidate routes, and guide the user along the determined driving route based on it, thus improving efficiency and predictability for time management of the user.

The apparatus of generating the route and the method thereof according to an exemplary embodiment of the present disclosure may be provided to calculate an estimated SoC for each route, based on one of the estimated amount of battery consumption for each link or the estimated amount of electrical energy recovery for each link and determine a candidate route including the largest estimated SoC for each route as the driving route, thus saving on fuel costs or the charging fee.

The apparatus of generating the route and the method thereof according to an exemplary embodiment of the present disclosure may be provided to calculate a slope of the road for each link, based on an altitude of the road for each link, and reflect the slope of the road for each link in calculating an estimated amount of battery consumption for each link or an estimated amount of electrical energy recovery for each link, thus more accurately calculating an estimated SoC for each route.

The apparatus of generating the route and the method thereof according to an exemplary embodiment of the present disclosure may be provided to calculate an estimated parking fee, based on a parking fee of a parking lot near to a destination, compare the estimated parking fee with an estimated battery charging fee, and notify the user of the compared result, thus saving on vehicle operation costs of the user.

The apparatus of generating the route and the method thereof according to an exemplary embodiment of the present disclosure may be provided to reflect a road preference of the user for a scale, a function, or the like of the road in determining a driving route or reflect one of a location of an attraction or an estimated stop time for the attraction in determining the driving route, thus improve driving satisfaction of the user.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

In various exemplary embodiments of the present disclosure, the apparatus of generating route 1000 may be accomplished by a control device.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of generating a route, the apparatus comprising:
   a communication device configured to receive destination information, location information of a vehicle, map information, and a desired arrival time of a user;
   a route generator configured to generate one or more candidate routes, based on the destination information, the location information, and the map information;
   a calculation device configured to calculate an estimated time for each link, an estimated amount of battery consumption for each link, and an estimated amount of electrical energy recovery for each link with respect to links making up the respective candidate routes based on the map information and the one or more candidate routes, and to calculate an estimated arrival time for each route and an estimated state of charge (SoC) for each route with respect to respective candidate routes included in the one or more candidate routes, based on the estimated time for each link, the estimated amount of battery consumption for each link, and the estimated amount of electrical energy recovery for each link;
   a driving route determination device configured to determine a driving route, based on the one or more candidate routes, the estimated arrival time for each route, the desired arrival time, and the estimated SoC for each route; and
   an interface configured to guide the user along the driving route,
   wherein the destination information includes a location which is a current location of a host vehicle and is a location where the user wants to return after a predetermined time, and
   wherein the driving route determination device determines, as the driving route, a candidate route having a largest estimated state of charge (SoC) for each route among the candidate routes in which a difference between the estimated arrival time for each route and the desired arrival time is within a preset time, based on the estimated state of charge (SoC) for each route calculated based on the estimated amount of electrical energy recovery for each link.

2. The apparatus of claim 1, wherein the calculation device is configured to calculate the estimated arrival time for each route, based on at least one of a value obtained by adding the estimated time for each link for each candidate route or a current time.

3. The apparatus of claim 1, wherein the calculation device is configured to calculate the estimated SoC for each route, based on at least one of a value obtained by adding the estimated amount of battery consumption for each link for each candidate route, a value obtained by adding the estimated amount of electrical energy recovery for each link for each candidate route, or a current SOC value of the vehicle.

4. The apparatus of claim 1,
   wherein the map information includes at least one of a traffic situation for each link, a vehicle average speed for each link, or a speed limit for each link, and
   wherein the calculation device is configured to calculate at least one of the estimated time for each link, the estimated amount of battery consumption for each link, or the estimated amount of electrical energy recovery for each link, based on at least one of the traffic situation for each link, the vehicle average speed for each link, the speed limit for each link, or the one or more candidate routes.

5. The apparatus of claim 1,
wherein the map information includes an altitude of a road for each link, and
wherein the calculation device is configured to calculate a slope of the road for each link, based on the altitude of the road for each link, and to calculate at least one of the estimated amount of battery consumption for each link or the estimated amount of electrical energy recovery for each link, according to at least one of the slope of the road for each link or the one or more candidate routes.

6. The apparatus of claim 1, further including:
a controller configured to control at least one of a motor or a braking device of the vehicle, according to at least one of the estimated amount of battery consumption for each link or the estimated amount of electrical energy recovery for each link with respect to links making up respective driving routes.

7. The apparatus of claim 1,
wherein the destination information includes information related to at least one of a location of a parking lot near to a destination of the vehicle or a parking fee of the parking lot,
wherein the communication device further receives information related to a battery charging fee of the vehicle, and
wherein the calculation device is configured to calculate an estimated battery charging fee, based on at least one of a current SOC value of the vehicle, an estimated SoC for the driving route, or the battery charging fee, to calculate an estimated parking fee, based on at least one of the desired arrival time or the parking fee, and to generate information notifying the user of the estimated parking fee, in accordance with a result of comparing the estimated battery charging fee with the estimated parking fee.

8. The apparatus of claim 1,
wherein the communication device further receives information related to a road preference of the user for one of a scale or a function of a road, and
wherein the route generator is configured to generate the one or more candidate routes, based on at least one of the information related to the road preference, the location information, the map information, or the destination information.

9. The apparatus of claim 1,
wherein the communication device further receives attraction information including at least one of a location of an attraction located near to the vehicle or a destination or an estimated stop time for the attraction, and
wherein the route generator is configured to generate the one or more candidate routes, based on at least one of the attraction information, the location information, the map information, or the destination information.

10. A method for generating a route, the method comprising:
receiving, by a communication device, destination information, location information of a vehicle, map information, and a desired arrival time of a user;
generating, by a route generator, one or more candidate routes, based on the destination information, the location information and the map information;
calculating, by a calculation device, an estimated time for each link, an estimated amount of battery consumption for each link, and an estimated amount of electrical energy recovery for each link with respect to links making up the respective candidate routes based on the map information and the one or more candidate routes, and calculating an estimated arrival time for each route and an estimated SoC for each route with respect to respective candidate routes included in the one or more candidate routes, based on the estimated time for each link, the estimated amount of battery consumption for each link, and the estimated amount of electrical energy recovery for each link;
determining, by a driving route determination device, a driving route, based on the one or more candidate routes, the estimated arrival time for each route, the desired arrival time, and the estimated SoC for each route; and
guiding, by the interface, the user along the driving route,
wherein the destination information includes a location which is a current location of a host vehicle and is a location where the user wants to return after a predetermined time,
wherein the driving route determination device determines, as the driving route, a candidate route having a largest estimated state of charge (SoC) for each route among the candidate routes in which a difference between the estimated arrival time for each route and the desired arrival time is within a preset time, based on the estimated state of charge (SoC) for each route calculated based on the estimated amount of electrical energy recovery for each link.

11. The method of claim 10, wherein the calculating of at least one of the estimated arrival time for each route or the estimated SoC for each route, based on at least one of the estimated time for each link, the estimated amount of battery consumption for each link, or the estimated amount of electrical energy recovery for each link includes:
calculating, by the calculation device, the estimated arrival time for each route, based on at least one of a value obtained by adding the estimated time for each link for each candidate route or a current time.

12. The method of claim 10, wherein the calculating of at least one of the estimated arrival time for each route or the estimated SoC for each route, based on at least one of the estimated time for each link, the estimated amount of battery consumption for each link, or the estimated amount of electrical energy recovery for each link includes:
calculating, by the calculation device, the estimated SoC for each route, based on at least one of a value obtained by adding the estimated amount of battery consumption for each link for each candidate route, a value obtained by adding the estimated amount of electrical energy recovery for each link for each candidate route, or a current SOC value of the vehicle.

13. The method of claim 10,
wherein the map information includes at least one of a traffic situation for each link, a vehicle average speed for each link, or a speed limit for each link, and
wherein the calculating of at least one of the estimated arrival time for each route or the estimated SoC for each route, based on at least one of the estimated time for each link, the estimated amount of battery consumption for each link, or the estimated amount of electrical energy recovery for each link includes:
calculating, by the calculation device, at least one of the estimated time for each link, the estimated amount of battery consumption for each link, or the estimated amount of electrical energy recovery for each link, based on at least one of the traffic situation for each link, the vehicle average speed for each link, the speed limit for each link, or the one or more candidate routes.

14. The method of claim 10,
wherein the map information includes an altitude of a road for each link, and
wherein the calculating of at least one of the estimated time for each link, the estimated amount of battery consumption for each link, or the estimated amount of electrical energy recovery for each link includes:
calculating, by the calculation device, a slope of the road for each link, based on the altitude of the road for each link; and
calculating, by the calculation device, at least one of the estimated amount of battery consumption for each link or the estimated amount of electrical energy recovery for each link, according to at least one of the slope of the road for each link or the one or more candidate routes.

15. The method of claim 10, further including:
controlling, by a controller, at least one of a motor or a braking device of the vehicle, according to at least one of the estimated amount of battery consumption for each link or the estimated amount of electrical energy recovery for each link with respect to links making up respective driving routes.

16. The method of claim 10, wherein the destination information includes information related to at least one of a location of a parking lot near to a destination of the vehicle or a parking fee of the parking lot,
wherein the receiving includes:
receiving, by the communication device, information related to a battery charging fee of the vehicle, and
wherein the calculating includes:
calculating, by the calculation device, an estimated battery charging fee, based on at least one of a current SOC value of the vehicle, an estimated SoC for the driving route, or the battery charging fee;
calculating, by the calculation device, an estimated parking fee, based on at least one of the desired arrival time or the parking fee; and
generating, by the calculation device, information notifying the user of the estimated parking fee, in accordance with a result of comparing the estimated battery charging fee with the estimated parking fee.

* * * * *